United States Patent [19]

Duke

[11] 3,892,783

[45] July 1, 1975

[54] PREPARATION OF ALKYL FURANS BY DEHYDROCYCLIZATION

[75] Inventor: Roy B. Duke, Littleton, Colo.

[73] Assignee: Marathon Oil Company, Findlay, Ohio

[22] Filed: Mar. 5, 1971

[21] Appl. No.: 121,579

[52] U.S. Cl. .................................. 260/346.1 R
[51] Int. Cl. ................................... C07d 5/16
[58] Field of Search ........................ 260/346.1 R

[56] References Cited
UNITED STATES PATENTS

| | | | |
|---|---|---|---|
| 3,122,587 | 2/1964 | Stansbury, Jr. et al. | 260/346.1 |
| 3,228,966 | 1/1966 | Adams | 260/346.1 |
| 3,600,405 | 8/1971 | Besozzi | 260/346.1 |

OTHER PUBLICATIONS

Skarchenko, Russian Chem. Reviews (1968) Vol. 37 (1), pp. 1–16.

Faulk et al., J. of Organic Chem., May 1970, Vol. 5, pp. 1518–1525.

Adams, Journal of Catalysis (1968), Vol. 11, pp. 96–112.

Primary Examiner—Henry R. Jiles
Assistant Examiner—Bernard I. Dentz
Attorney, Agent, or Firm—Joseph C. Herring; Richard C. Willson, Jr.; J. L. Hummel

[57] ABSTRACT

Mesityl oxide, a simple condensation product of acetone, is oxidatively dehydrogenated and dehydrocyclized in the presence of oxygen and a halogen promoter to give dimethylfuran, a high octane gasoline blending component. By adding or subtracting lower alkyl groups from the starting materials, corresponding mono-, poly-lower alkyl furans can be produced.

23 Claims, No Drawings

PREPARATION OF ALKYL FURANS BY DEHYDROCYCLIZATION

CROSS REFERENCES TO RELATED APPLICATIONS

The following U.S. patent applications relate to the general field of oxydehydrogenation: Ser. No. 722,170 filed Apr. 18, 1968 now abandoned, Ser. No. 851,737 filed Aug. 20, 1969 (A continuation-in-part thereof) now U.S. Pat. No. 3,522,323, Ser. No. 828,351 filed May 27, 1969 now U.S. Patent 3,646,018, Ser. No. 839,045 filed July 3, 1969.

BACKGROUND OF THE INVENTION

1. Field of the Invention

The present invention relates to the chemistry of carbon compounds, more specifically the preparation of alkyl furans.

2. Description of the Prior Art

Canadian Pat. No. 213,072 discloses a process for converting mesityl oxide to 2,5-dimethylfuran by a sulfur-promoted (e.g., $SO_2$, $H_2S$, S) dehydrogenation process catalyzed by vanadium pentoxide, but the techniques of the present invention tend, in general, to provide substantially improved yields and selectivities as compared with the process of the Canadian patent.

Various Chemical Abstracts relate to dimethylfuran, e.g., 66 CA 60566m (their methyl-methyl spin couplings), 26 CA 5560 (production of various furan compounds), 26 CA 1278 (their reactions with HCN and HCl), 1933 CA 2147–8 (their color and preparation), 39 CA 136.6 (their toxicology 31 CA 8528.9 (their oxidation), 1956 CA 7773g (their mercuration), 1949 CA 4301i (their hydrogenation), 1948 CA 7962h (their "knock-limited power"), 1958 CA 12833i (preparation of tetrahydro-derivative), 1958 CA 12834 (their catalytic hydrogenolysis), 52 CA 12835b (their preparation), 1960 CA 70e (position of C-H deformation frequencies), 43 CA 1391g (preparation by reaction of $Me_2C$: CH COMe, $H_2SO_4$ and $Ac_2O$ + pyrolysis), Canadian 713,072 (their preparation from acetyloxide with vanadium pentoxide or hetryl polycatalyst), 1951 CA 602c (their preparation by pyrolysis of a sulfone), 1946 CA 6794.5 (their blending octane numbers), 36 CA 6780.2 (their preparation from wood-products), 18031h (preparation by catalytic conversion of mesityl oxide at 500°C. in presence of O (air) or $SO_2$ with $V_2O_5$ or Co or Bi/CrMo, W or P/S or O catalyst, e.g., bismuth molybdate), 65 CA 7252c (preparation by thermal degradation of D-glucose), 60 CA 13108b (their acid-catalyzed hydrolysis), 56 CA 1084d (their proton magnetic resonant spectra), 1962 CA 11490e (preparation 2,5-dimethylfuran from $(AcCH_2)_2$ and $C_3O_2$ in dry $Et_2O$ with $H_2SO_4$), 1964 CA 13142h (their reactions with molecular oxygen in an excited singlet state), 59 1963 Vol. 59 CA 13913d (preparation from furan-2,5-diacetic acid by heating under heating in vacuo), 58 CA 495a (preparation), 54 CA 24360a (oxidative ring cleavage), 54 CA 20443 (photochemical reactions), 43 CA 4700c (preparation from 3-Hexen-5-yn-2-ol (III) $H_2SO_4$ by steam distillation; III $HgCL_2$ in $H_2O$ and Etoh are distilled to produce 2,5-dimethylfuran. III/MeOH added to $HgO-BF_3$ catalyst treated with $K_2CO_3$ and distilled to produce 2,5-dimethylfuran), 1949 CA 5805i (U.S. Pat. No. 2,470,070), 44 CA 2552h (preparation from AcOC (:$CH_3$) Me with AC ($CH_2$)$_2$ AC and $H_2SO_4$), U.S. Pat. No. 2,482,066, 44 CA 3140i (assay of acute toxicity), 3037i (preparation from ($AcCH_2$)C and $P_2S_6$), 1952 CA 11178 (preparation from 3,4-dimethyl-2,5-hexanedione, $Ac_2O$, $ZnCl_2$, NaOH by steam distillation), 47 CA 1683g (preparation from 2,-5-dimethylfuran-3-carboxylic acid by evaporating with $Ba(OH)_2$ and distilling), 1953 CA 9957g (preparation from ($AcCH_2$)$_2$ with $P_2O_5$ in boiling tetrahydronaphthalene), 49 CA 1815d (U.S. Pat. No. 2,650,236 (preparation from (R'CH(OH)-C:)$_2$ by dehydration over $CoMoO_4$ at 250°–500°), 1955 CA 4509b (preparation by distillation of $HC:CCH_2$ $CH_2$ Ac with $P_2O_5$), 42 CA 5208c (presence in peat), 50 CA 5035b (oxidation products), 7550b (photochemical reactions), 32 CA 195.3 (U.S. Pat. No. 2,098,592, preparation by pyrolysis of acetone), 37 CA 4071.6 (preparation from 5-methylfurfural with hydrozene and NaOet), 39 CA 1140.8 (preparation from ($CH_2AC$)$_2$ and pectinol), 40 CA 2791.6 (preparation from MeCH:CHCOC:CH and $H_2SO_4$, steam distilled), 30 CA 770.2 (anesthetic effects), 1934 CA 2321.4 (preparation as by-products in synthesis of AcOH from $C_2H_2$), 1946 CA 6074.4 (autoxidation), 66 CA 2076d (substitution effects in nuclear magnetic resonance), 66 CA 2406b (oxidation of organics by singlet oxygen), 66 CA 60429m (oxidation of furan with olefins), 68 CA 78046t (preparation from dicarbethoxy-2,2'-bifuran in tetrahydrofuran with $P_2O$ and $LiAlH_4$), 68 CA 73669p (infrared studies), 69 CA 91641y (prediction of nuclear magnetic resonance ring proton shifts), 69 CA 47738c (frequency calculation of vibrational spectra), 1954 CA chromic acid oxidation of dimethylfuran), 48 CA 2028 (oxidation of methylfurfural with $NaIO_4$ to produce dimer).

None of the above prior art appears to teach a process having the valuable yields, simplicity of apparatus and adaptability to simple continuous operation of the present invention.

SUMMARY OF THE INVENTION

General Statement of the Invention

According to the invention, carbonyl-containing olefins are oxidatively dehydrocyclyzed in the presence of a halogen such as iodine.

In preferred embodiments of the invention, starting materials having the structural formula:

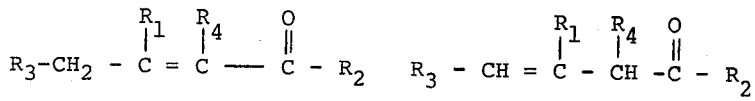

I  II

CA 4047d (polymerization), 1964 CA 7110a (polymerization), 60 CA 4080h (their bromination), 1963 CA 15237 (their reactions with hydrogen peroxide), are dehydrocyclized in the presence of halogen, oxygen, and a catalyst to produce an alkyl furan having the general formula:

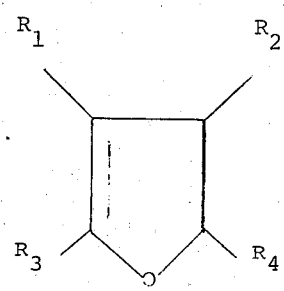

wherein R is hydrogen or alkyl, more preferably hydrogen or lower alkyl, most preferably hydrogen, ethyl or methyl and wherein the R's may be the same or different. For example, two of the R's may be hydrogen and two, methyl. Also, preferably the starting material is mesityl oxide. The R's can be unsubstituted or substituted, e.g., with $NO_2$, Cl, Br, I, F, or CN groups so long as the substituents do not interfere with the reaction of the catalysts. This can readily be established by routine trial runs.

The process is conducted in the vapor phase by forming a reaction mixture of the carbonyl-containing olefin with oxygen or with molecular oxygen-containing gas and a halogen or halogen-containing compound and then passing the reaction mixture through a reactor containing the catalyst. The catalyst is preferably a metallic salt, hydroxide or oxide of an element selected from Group Ia, IIa, Ib, VIb, VIII or the Lanthanide Series of the Periodic Table of the Elements or mixtures thereof.

As compared to the aforementioned prior art processes, the more direct route of the present invention reduces capital investment required for commercial alkyl furan production facilities, simplifies operations and reduces operating costs.

Utility of the Invention

The alkyl furans and their tetrahydro-derivatives are useful as solvents and as gasoline additives. In the latter application, they are reported to have high blending octane numbers (see e.g., 1948 C 2962h, 1946 CA 6794.5). These are also useful as anesthetics (see 30 CA 770.3).

BRIEF DESCRIPTION OF THE DRAWINGS

Because of the nature of the present process no drawing is provided in the present application.

DESCRIPTION OF THE PREFERRED EMBODIMENTS

Starting Materials

The carbonyl-containing olefins which may be utilized as starting materials for this invention preferably have from 5 to about 30, more preferably 6 to 12, and most preferably 6 to 8 carbon atoms. The preferred compounds for use as starting materials have the following general structure:

wherein R may be hydrogen, alkyl (e.g., methyl, ethyl, isopropyl, butyl, pentyl, hexyl). Suitable organic compounds include mesityl oxide, isomesityl oxide, 3,4-dimethyl-3-penten-2-one, 3,4-dimethyl-4-penten-2-one, 3,4-dimethyl-3-hexen-2-one, 3,4-dimethyl-4-hexen-2-one, and the like.

The halogen promoter used in the present invention can be a halogen, e.g., iodine, bromine, chlorine, or an interhalogen compound, e.g., iodine monochloride, bromine monochloride, or hydrohalic acid, e.g., hydrogen chloride, hydrogen bromide or hydrogen iodide or mixtures thereof. The molar ratio of halogen-to-carbonyl-containing olefin in the reaction mixture will preferably be about 0.001 to about 1.0, more preferably 0.005 to about 0.10 and most preferably from about 0.01 to about 0.05. Mixtures of halogen-containing compounds or of carbonyl-containing olefins or of catalyst may, of course, be employed.

Oxidizing Agent

Oxygen, the preferred oxidizing agent, can be introduced to the reactor as pure oxygen, or as oxygen diluted with other gases such as helium, nitrogen, carbon monoxide, carbon dioxide, or as air. The molar ratio of oxygen to hydrocarbon should be from 0.01 to 3.0 or greater and most preferably between 0.10 to about 1.2. It is also preferable to form a reaction mixture of the oxygen or molecular oxygen-containing gas, the hydrocarbon, and the halogen or halogen-containing compound prior to introducing the reactants into the reactor.

Catalysts

Many catalysts have been evaluated in the twostage oxydehydrogenation process other than those described in the Examples. All of these catalysts have given higher yields and selectivities in the two-stage oxydehydrogenation process as compared to single-stage operation. Of the catalysts evaluated, those consisting of metallic salts, oxides, and hydroxides, and mixtures thereof containing elements of Groups Ia, IIa, Ib, VIb, VIII, and the Lanthanide Series of the Periodic Table of the Elements proved superior. Catalyst salts and hydroxides will generally be converted to oxides during the reactions of the invention.

The preferred catalysts for use in the present invention are chromites of the general formula:

$$(M^i)_j (Cr_2O_4)_k$$

where $i$ is the valence state of metal M and $j$, and $k$ are integers such that:

$$j = \frac{2k}{i}$$

and M is preferably an element from Groups, IIa, IVa, Va, or Ib through VIIb and VIII of the Periodic Table. Rare earth element chromites are also excellent catalysts. Mixtures of several chromites are also acceptable

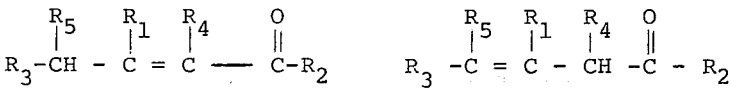

I   II catalysts, as well as chromites containing lesser amounts of oxides, hydroxides, or salts of the elements of Group Ia of the Periodic Table.

The most preferred catalyst for use in the present invention is a copper chromite composition. The copper chromite catalysts may be modified to incorporate the synergistic effects of lesser amounts of the elements of Groups Ia, IIa, VIII and the Lanthanide Series of the Periodic Table of the Elements in the form of salts, hydroxides, or oxides. Such catalyst may be obtained commercially or may be prepared by one skilled in the art. Commercially available catalysts such as Girdler's G–22 and T–531, or Harshaw's Cu–1800 and Cu–1106 are suitable. Alternatively, the copper chromite catalysts may be prepared by thermally decomposing copper chromate, or by other methods employed by those skilled in the art. A review of the various routes to chromites may be found in the following references: *Chromium*, M. J. Udy, Reinhold Publishing Co., New York, 1956 and *Reactions of Organic Compounds over Copper-Chromium Oxide and Nickel Catalysts*, Homer Adkins, University of Wisconsin Press, 1937. The chromite catalysts may be tableted for use in fixed bed reactors or may be pulverized and sized for use in fluidized bed reactors. The tableted catalysts may contain binders such as sodium silicate, sodium aluminate, magnesium silicate, and the like, or may be supported on carriers such as Kieselguhr, alumina, silica, magnesia, zirconia, thoria, pumice, and the like. The surface areas of the catalysts range between 0.1 and 300 square meters per gram.

Reactors

The reactors used in the practice of this invention are preferably constructed of, or lined with, or otherwise contain, titanium, tantalum, nickel, or alloys containing one or more of the these metals. Particularly preferred are alloys containing at least 40% weight nickel, 0 to 30% of the metals iron, chromium, and molybdenum, and 0 to 10% of the metals vanadium, cobalt, tantalum, and niobium, and 0–10% of the element silicon. Examples of such useful alloys of nickel include the stainless steels, the Hastelloys,* the Inconels and the Incoloys. The reactor shape is not narrowly critical, although tubes are most convenient. In particularly preferred embodiments, the upper-portion of the reactor is packed with the inert substances such as ceramic, Mullite, Carborundum, glass, Vermiculite, Alundum, naturally occurring granular rocks and the like over which the reaction mixture is passed prior to entering the catalyst section of the reactor, thus providing a two-stage reactor. Alternatively, the reactants may be preheated in tubes, pipes, etc. made of the above-mentioned alloys or other materials which are substantially inert, such as clays, Mullite, Alundum, or other ceramic compositions. The ratio of the volume of inert to the volume of catalyst zones can be varied to suit the particular feed and conditions employed. In general, the inert zone volume will be preferably 0.2 to 20, more preferably 0.4 to 5, and most preferably 0.6 to 2 times the volume of the catalyst zone.

*Trademark of Hanes Stellite Co., Div. of Union Carbide Corp., 270 Park Ave., NY .10017; for a series of nickelbase alloys, having high resistance to corrosives, such as hot hydrochloric acid, hot sulfuric acid, wet chlorine, etc. as well as excellent physical and mechanical properties. **Trademarks of International Nickel Co., 71 Wall St. NY, 10005; Inconel-an alloy containing approximately 76% nickel, 16% chromium, & 6% iron; Incoloy-an alloy containing approximately 32% nickel, 21% chromium & 46% iron.

Preferably, the catalyst contains an alloy containing at least 40 weight percent nickel, together with from 0 to 30% of metal selected from the group consisting of iron, chromium, and molybdnum, together with 0 to 10% of the metal selected from the group consisting of vanadium, cobalt, tantalum and niobium and 0 to 10% of silicon.

Inert Materials

The inert materials which are useful in the practice of this invention include those materials which do not react with the halogen promoter under the conditions of the reaction. Substances such as glass, Carborundum, ceramics, Mullite, Alundum, Vermiculite, granular rocks, and the like, fall into the category of inert materials. The reactor, however, need not necessarily be packed with one of said inert materials over which the reaction mixture is passed prior to contact with the catalyst, although this is preferable. Alternatively, the reaction mixture may be passed through tubes, pipes, and the like, made of alloys, ceramic materials, or other materials that do not react with the halogen under the conditions of the reaction, but do present contact surfaces.

Temperature

The reaction is effected by passing the reaction mixture first through the section of the reactor containing the inert substance or void space at temperatures ranging from 300° to 1300°F., but preferably between 600° and 1200°F., and then through the section of the reactor containing the catalyst at temperatures ranging from 300° to 1300°F., but preferably between 600° and 1200°F. Most preferably, the two sections of the reactor are operated between 750° and 1150°F. It is not necessary to operate both sections at the same temperature and in certain instances, improved yields are obtained when operating the two sections of the reactor at different temperatures.

Pressures

The reaction may be effected at pressures ranging from 0.01 to 100 atmospheres, but preferably between 0.1 to 5 atmospheres, and most preferably at about 0.8 to about 1.2 atmospheres.

Flow Rates

The flow rates of the reactants may be varied widely but, preferably, the flow rates of the hydrocarbons should range from about 0.01 to about 10 liquid volumes per volume of reactor per hour and most preferably, between about 0.10 to 1.0 liquid volumes of organic compound per volume of reactor per hour. Space velocities may also be calculated in terms of gaseous hourly space velocity, abbreviated GHSV, which is defined as the volumes of reactant vapor, calculated under standard conditions (STP), passed per hour per unit volume of the reaction zone. Inert gases, such as nitrogen and helium are considered as part of the reactant vapor. Gaseous hourly space velocities between about 5 and 1500 hrs$^{-1}$ may be employed for the oxidative dehydrogenation reaction but, preferably, between 10 and 1000 hrs$^{-1}$, and most preferably between 100 to 600 hrs$^{-1}$ are used.

Batch or Continuous Operation

While the present invention will preferably be conducted on a continuous basis with continuous feed of starting materials and removal of products, it may, in some instances, be preferable to produce specialized products in a batch-type reactor, e.g., an autoclave. However, the flow from an inert contact section to a catalytic reactor section will be advantageous even in batch-type operations.

EXAMPLES

Each of the following examples is carried out in a tubular reactor, 1 inch in diameter and 26 inches long, constructed of Hastelloy C alloy. The reactor has an internal thermowell, 0.25 inch in diameter extending the length of the reactor. The reactor is heated in a furnace and the temperature controlled and recorded from thermocouples located inside the thermowell. The lower-half of the reactor volume was filled with a tableted copper-chromite catalyst and the upperhalf with ⅛ inch Mullite spheres.

The starting materials, e.g., mesityl oxide in which the halogen is dissolved, are fed to a mixing tee by means of a calibrated metering pump and then mixed in the tee with air apportioned through a calibrated rotometer. The reaction mixture is then passed downward through the reactor. The flow rates are calculated in terms of gaseous hourly space velocity (GHSV). All the liquids charged to the reactor are assumed to be ideal gases at standard temperature and pressure. The oxygen-to-carbonyl-containing ratios are molar ratios.

The reactor effluent is passed through a Graham-type chilled-water condenser and then through a dry-ice trap. The products are analyzed by chromatographic techniques. Conversion, yields, and selectivities are calculated on the amount of condensed material in the following manner:

$$\text{Conversion} = \frac{100 \text{ (moles carbonyl-containing olefin reacted)}}{\text{(carbonyl-containing olefin charged)}}$$

$$\text{Yield} = \frac{100 \text{ (moles alkyl furan)}}{\text{(moles carbonyl-containing olefin charged)}}$$

$$\text{Selectivity} = \frac{\text{yield}}{\text{conversion}}$$

Results utilizing mesityl oxide as a starting material are summarized in Table 1.

Table 1

Iodine-Promoted, Oxydehydrogenation of Mesityl Oxide

| Example No. | Temp. °F. | $O_2$/MO | $I_2$ % | GHSV hr$^{-1}$ | Dimethylfuran Yield,% | Selectivity | High Boilers Wt % |
|---|---|---|---|---|---|---|---|
| 1 | 900 | 0.75 | 1.0 | 100 | 13.5 | 0.318 | 2.3 |
| 2 | 900 | 0.56 | 1.0 | 102 | 11.6 | 0.356 | 2.2 |
| 3 | 900 | 0.23 | 1.0 | 106 | 9.3 | 0.29 | 2.2 |
| 4 | 1000 | 0.5 | 1.0 | 100 | 23.1 | 0.508 | 4.6 |
| 5 | 950 | 0.5 | 1.0 | 100 | 14.4 | 0.461 | 2.2 |

EXAMPLES 6 THROUGH 9

When different starting materials are fed under similar conditions to the same reactor with the other starting materials as in Table 1, the corresponding products shown in Table 2 below, are obtained.

Table 2

| Example | Starting Material | Products |
|---|---|---|
| 6 | 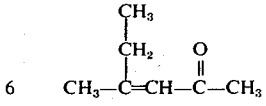 | 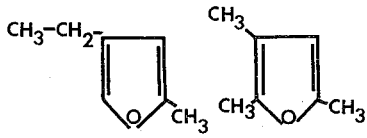 |
| 7 | 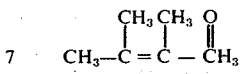 | 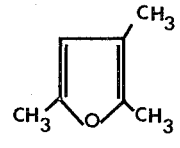 |
| 8 | 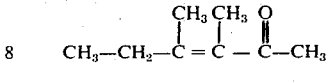 | 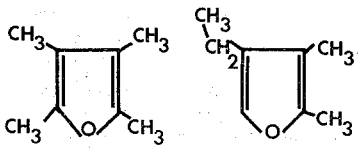 |

Table 2—Continued

| Example | Starting Material | Products |
|---|---|---|
| 9 | n—C₅H₁₁—CH₂—C(i-C₃H₇)=C(CH₃)—C(O)—C₂H₅ | 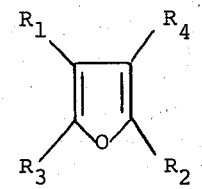 |

Modifications of the Invention

It should be understood that the invention is capable of a wide variety of modifications and variations which will be apparent to those skilled in the art upon a reading of the present specification.

For example, various other carbonyl-containing olefins including isomesityl oxide, 3,4-dimethyl-3-hexene-2-one, 3,4-dimethyl-3-pentene-2-one, may be utilized in place of the mesityl oxide and other starting materials exemplified above. Different promoters including bromine can be utilized in place of the iodine. Any of the wide variety of metallic oxides, salts or hydroxides described under the heading "Catalyst" above can be substituted for the copper chromite exemplified. The inert materials may be dispensed with and the reactor completely filled with the catalyst, although yields will be significantly reduced in so doing. Various different inert materials may be substituted for the first portion of the reactor, e.g., alundum, glass, Mullite, etc. Various portions of the reactor may be operated at different temperatures and the optimum temperature for each portion of the two stage reactor design can be readily determined by routine trial runs. Oxygen or molecular oxygen-containing gases other than air, can be substituted for the air utilized in the above examples. The first zone of the reactor can be allowed to remain empty with the walls of the reactor itself serving as contact surface and, to some extent,

What is claimed is:

1. A process for the preparation of alkyl furans comprising oxidatively dehydrogenating and dehydrocyclizing a hydrocarbon starting compound having the structure:

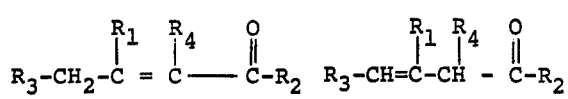

I      II in the presence of a halogen selected from the group consisting of iodine, bromine, chlorine, interhalogen compounds and hydrohalic acids and molecular oxygen to form alkyl furans having the structure:

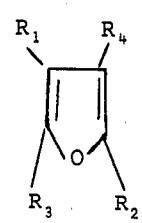

wherein said reaction is conducted in the vapor phase at at temperature of from about 300° to about 1300°F. and in the presence of a catalyst comprising copper chromite with or without other metallic salts, hydroxides, or oxides, or mixtures of elements from Groups Ia, IIa, Ib, VIb and VIII or the Lanthanide Series of the Periodic Table of the Elements at a gaseous hourly space velocity of from about 5 to about 1500 hours⁻¹ and wherein R₁, R₂, R₃ and R₄ can be the same or different lower alkyl groups or hydrogen.

2. The process of claim 1 wherein R₁, R₂, R₃, and R₄ are each selected from the group consisting of methyl, ethyl, and hydrogen.

3. The process of claim 1 wherein the catalyst comprises copper chromite and salts, hydroxides, or oxides of the elements of Groups Ia, IIa, VIII or the Lanthanide Series of the Periodic Table of the Elements.

4. A process according to claim 1 wherein the starting material comprises mesityl oxide.

5. A process for the preparation of alkyl furans comprising oxidatively dehydrogenating and dehydrocyclizing a starting compound having the structure:

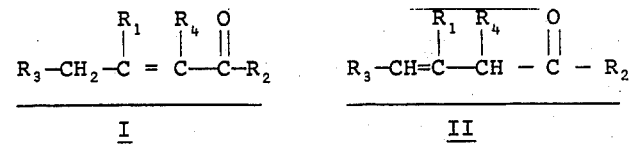

I      II in the presence of a halogen selected from the group consisting of iodine, bromine, chlorine, interhalogen compounds and hydrohalic acids and molecular oxygen to form alkyl furans having the structure:

wherein said reaction is conducted in the vapor stage at a temperature of from about 300° to about 1300°F.

in a reaction means comprising two zones, the first consisting of either substantially free space or containing a substance substantially inert to reactions with the halogen or halogen-containing compounds, and the second zone containing a catalyst comprising copper chromite and wherein $R_1$, $R_2$, $R_3$, and $R_4$ can be the same or different lower alkyl groups or hydrogen.

6. The process of claim 5 wherein the catalyst comprises copper chromite and a salt, oxide, or hydroxide of a metal selected from the group consisting of barium, iron, nickel, or cerium.

7. The process of claim 6 wherein the reaction is conducted in a reactor constructed of or lined with alloy and wherein the alloy contains at least 40 weight percent nickel, together with from 0 to 30% of metal selected from the group consisting of iron, chromium, and molybdenum and together with 0 to 10% of the metal selected from the group consisting of vanadium, cobalt, tantalum, and niobium and 0 to 10% of silicon.

8. The process of claim 5 wherein oxygen is present in a molar ratio of from about 0.1 to about 3 moles per mole of said starting compound present in the reaction mixture.

9. The process of claim 5 wherein the halogen is in a molar ratio of from about 0.001 to about 0.1 mole of elemental or combined halogen per mole of hydrocarbon present in the reaction mixture.

10. The process of claim 5 wherein the reaction mixture is passed over said inert material at a temperature of from about 600° to about 1200°F.

11. The process of claim 5 wherein the reaction mixture is passed over the catalyst at a temperature of from about 600° to about 1200°F.

12. The process of claim 5 wherein the reaction is conducted at a pressure in the range of from about 0.1 to about 10 atmospheres.

13. The process of claim 5 wherein the halogen is present in the form of a halogen-containing compound comprising hydrochloric, hydrobromic, or hydroiodic acid.

14. The process of claim 5 wherein the halogen is present in the form of an interhalogen compound.

15. The process of claim 5 wherein the halogen comprises chlorine, bromine or iodine.

16. The process of claim 5 wherein the inert material of the first zone comprises clay.

17. The process of claim 5 wherein the inert material of the first zone comprises expanded hydrosilicate.

18. The process of claim 5 wherein the inert material of the first zone comprises silicon carbide.

19. The process of claim 5 wherein the inert material of the first zone comprises granular rock.

20. The process of claim 5 wherein the inert material of the first zone comprises fused alumina.

21. The process of claim 5 wherein the inert material of the first zone comprises alumina silicate.

22. The process of claim 5 wherein $R_1$, $R_2$, $R_3$, and $R_4$ are methyl or hydrogen.

23. A process according to claim 22 wherein $R_1$ and $R_4$ are hydrogen.

* * * * *

UNITED STATES PATENT OFFICE
CERTIFICATE OF CORRECTION

Patent No. 3,892,783  Dated July 1, 1975

Inventor(s)  Roy B. Duke

It is certified that error appears in the above-identified patent and that said Letters Patent are hereby corrected as shown below:

Column 1, line 33:  after "toxicology" insert --),--

Column 2, line 31:  delete "770.2" and substitute therefor --770.3--

Column 4, line 34:  rewrite "twostage" as --two-stage--

Column 5, line 37:  delete "the"

Column 6, line 4:   delete "molybdnum" and substitute therefor --molybdenum--

Column 6, line 46:  delete "to" and substitute therefor --and--

Column 7, formula in Example 7:  change formula to read as follows

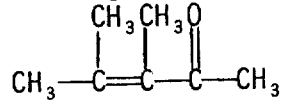

Column 9, line 33:  delete "alundum" and substitute therefor --Alundum--

Column 9, line 42:  should read --contact surface.--

Column 10, line 24: delete "at" at second occurrence and substitute therefor --a--

*Signed and Sealed this*

*Twenty-ninth* Day of *May 1979*

[SEAL]

Attest:

RUTH C. MASON  
Attesting Officer

DONALD W. BANNER  
Commissioner of Patents and Trademarks